Feb. 19, 1957 E. O. LIEBIG 2,781,580
DENTAL PROSTHETIC DEVICE
Filed June 8, 1955
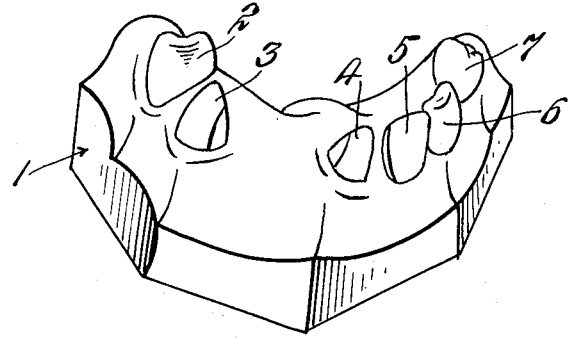
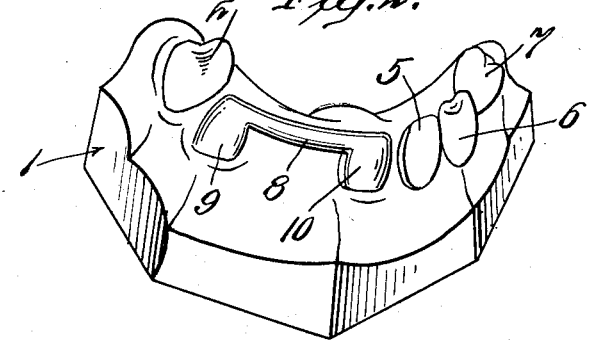
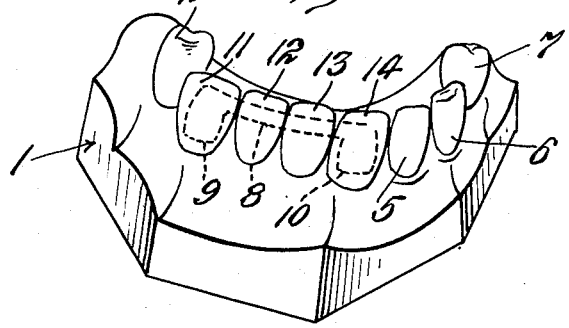
INVENTOR.
EDWARD O. LIEBIG
BY
ATTORNEY

United States Patent Office 2,781,580
Patented Feb. 19, 1957

2,781,580

DENTAL PROSTHETIC DEVICE

Edward O. Liebig, Chatham, N. J., assignor to Baker & Co., Inc., Newark, N. J., a corporation of New Jersey Application June 8, 1955, Serial No. 513,969

4 Claims. (Cl. 32—5)

The present invention deals with a dental prosthetic device, and, more particularly, with a metal-supported porcelain member for dental prosthesis.

In dental prosthesis, it is known to provide cast metal structures such as bridge work, including skeletons, crowns, copings, reinforcement bars, etc., upon which porcelain is baked, for example, in the form of a tooth or teeth.

The castings are generally composed of a platinum-iridium alloy, e. g. platinum-10% iridium, because of the compatible temperature coefficient of expansion of such metal and porcelain. Also, certain porcelains fuse at high temperatures, e. g. 2450° F., and such alloy permits the baking of such porcelain thereon with satisfactory adherence and without cracking or discoloration of porcelain.

However, the platinum-iridium alloy is expensive, and attempts have been made to provide more economical substitute castings which would have the desirable qualities of platinum-iridium. Such attempts were not altogether successful because the substitute alloys employed subjected the porcelain to oxide or gas discoloration, adherence between porcelain and the metal was not satisfactory, and adjustments had to be made in the technique of applying porcelain to such castings and to modify the porcelain to compensate for the difference in coefficient of expansion of the castings and the porcelain to prevent cracking of the porcelain on cooling.

It is an object of the present invention to provide an economical substitute alloy for platinum-iridium as employed in dental prosthetic devices. It is a further object of the present invention to provide a dental prosthetic device comprising a desirable metal casting with a porcelain member securely bonded thereon, and which porcelain member is free of discoloration. Other objects and advantages will become apparent from the description hereinafter following, and the drawings forming a part hereof, in which:

Figure 1 is a perspective view of a dental case prior to the application of a prosthetic device thereto, Figure 2 is a perspective view of a dental case including a case metal structure bridging a pair of teeth, and Figure 3 is a perspective view of a finished dental case showing porcelain teeth bonded to the metal bridge illustrated by Figure 2.

The present invention deals with a dental prosthetic device comprising a porcelain member securely bonded to a metal base composed of an alloy which permits the bonding of porcelain thereto without discoloration.

Referring to the drawings, Figure 1 illustrates a dental arch member 1 with a plurality of teeth 2, 3, 4, 5, 6, and 7 imbedded therein, and a pair of which, teeth 3 and 4, are spaced apart and formed into tooth stubs preparatory to being capped and bridged by a metal bridge member.

Figure 2 illustrates the dental arch member and teeth of Figure 1, with a metal bridge member 8 bridging tooth stubs 3 and 4 and having a pair of metal caps 9 and 10 which are mounted on the tooth stubs 3 and 4.

Figure 3 illustrates the dental arch member of Figure 2, with a dental prosthetic device which consists of a plurality of porcelain teeth 11, 12, 13, and 14 bonded to the bridge 8, for example, baked onto the bridge 8, and preferably encasing the said bridge and covering the outer surfaces of the said caps 9 and 10.

In order to render the above-described porcelain members free of discoloration and with satisfactory adherence, the metal casting is composed of an alloy of from 50%–80% palladium, 2%–15% platinum, 10%–30% gold, and 1%–10% rhodium, which alloys possess a hardness of BHN 110–180.

A preferred alloy consists of 63% palladium, 8% platinum, 22% gold, and 7% rhodium, and having a hardness of BHN 167. Another desirable alloy consists of 68% palladium, 6% platinum, 22% gold, and 4% rhodium, and having a hardness of BHN 142.

Alloys within the above-mentioned range provide desirable castings and fuse at temperatures above the fusing temperatures of the high fusing porcelains and otherwise are comparable with platinum-iridium castings with respect to adherence of porcelain and do not cause discoloration of the porcelain.

While the dental prosthetic device herein described is exemplified by the illustrations showing a porcelain covered bridgework, it is to be understood that the scope of the invention includes dental prosthetic devices of various structures consisting of porcelain bonded to a casting consisting of an alloy herein disclosed.

What I claim is:

1. A dental prosthetic device comprising a porcelain member bonded to a metal support consisting of an alloy of from 50%–80% palladium, 2%–15% platinum, 10%–30% gold, and 1%–10% rhodium.

2. A dental prosthetic device comprising a porcelain member bonded to a metal support consisting of an alloy of 63% palladium, 8% platinum, 22% gold, and 7% rhodium.

3. A dental prosthetic device comprising a porcelain member bonded to a metal support consisting of an alloy of 68% palladium, 6% platinum, 22% gold, and 4% rhodium.

4. A dental prosthetic device comprising a metal cap member, a porcelain member bonded to the outer surface of said cap, said cap member consisting of an alloy of from 50%–80% palladium, 2%–15% platinum, 10%–30% gold, and 1%–10% rhodium.

References Cited in the file of this patent

UNITED STATES PATENTS 2,572,377   O'Morrow _____ Oct. 23, 1951